(12) United States Patent
Eberling

(10) Patent No.: US 6,702,400 B1
(45) Date of Patent: Mar. 9, 2004

(54) SCHOOL BUS DOOR/SERVICE BRAKE INTERLOCK RETROFIT SYSTEM

(75) Inventor: Charles E. Eberling, Wellington, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 09/619,410

(22) Filed: Jul. 19, 2000

(51) Int. Cl.[7] .............................................. B60T 13/00
(52) U.S. Cl. ........................................................ 303/6.1
(58) Field of Search .............................. 303/6.1, 10, 11

(56) References Cited

U.S. PATENT DOCUMENTS

| | | | |
|---|---|---|---|
| 1,690,265 A | | 11/1928 | Bailey |
| 2,311,806 A | | 2/1943 | Almond |
| 3,651,457 A | | 3/1972 | Sprouse |
| 3,905,651 A | * | 9/1975 | Hornung ................ 303/6.1 |
| 4,166,513 A | * | 9/1979 | Johnson ................ 303/6.1 |
| 4,200,167 A | | 4/1980 | Cockman, Jr. |
| 4,546,845 A | * | 10/1985 | Meyer et al. ............. 303/6.1 |
| 4,699,435 A | * | 10/1987 | Wupper ................. 303/6.1 |
| 4,838,617 A | | 6/1989 | Deitchman et al. |
| 5,839,304 A | * | 11/1998 | Wills ................... 303/6.1 |

FOREIGN PATENT DOCUMENTS

| | | |
|---|---|---|
| JP | 08295212 | 12/1996 |
| JP | 09058430 | 4/1997 |
| JP | 11139301 | 5/1999 |

* cited by examiner

Primary Examiner—Matthew C. Graham

(57) ABSTRACT

A bus door/service brake interlock system having a warning system is provided to inform a driver that the service brake pressure is insufficient or not being applied at all, as well as indicating if a system malfunction occurs, precluding a service brake application. The system is based on a sequential operation of the driver activating the caution lights and opening the door. Once these events have occurred, the autobrake system including an alarm is activated. On the other hand, applying the park brake deactivates the autobrake system. The autobrake assembly energizes a solenoid that receives regulated pressure from a pressure reducing valve. This pressure is supplied to one side of a double check valve, while the other side receives a delivery from the foot valve to assure delivery for normal service braking.

17 Claims, 3 Drawing Sheets

SCHOOL BUS DOOR/SERVICE BRAKE INTERLOCK RETROFIT SYSTEM

BACKGROUND OF THE INVENTION

1. Field of the Invention

This invention relates in general to braking systems and, more particularly, to an interlock system that is easily retrofitted on existing vehicle systems or buses or can be adapted for incorporation as original equipment. This system allows for the installation of a simple auxiliary brake control device that controls only a single circuit while maintaining a high degree of confidence of warning to the driver should the system malfunction.

2. Discussion of the Art

Presently, some state laws require that an operator park a bus during passenger pickup. This necessitates that the operator or driver actuate a park brake, for example, pulling an actuating lever to apply a park brake. Repetitively actuating and deactuating the park brake can cause extreme fatigue to the driver and also frequent actuation requires durable components in the air brake system.

It is known in the industry, for example, as shown and described in U.S. Pat. No. 4,838,617, to interlock brakes with operation of the door. When the door is opened, the brakes are applied and cannot be released while the door remains opened. As taught in U.S. Pat. No. 4,838,617, a solenoid is energized and shifts a plunger to a blocking position in response to a door being opened. A valve maintains pressure in the brake line and prevents release of the brakes even if actuating pressure on the brake pedal is released. Once the door is closed, the solenoid is deenergized and the brakes are released.

Other systems, for example, as taught in U.S. Pat. No. 4,200,167, provide an interlock between the door handle of a bus and a series of switches, such as a brake light switch, gear shift, and a driver control switch before the door is permitted to open.

It is suggested by the present applicant that a safe course of action can be achieved by urging the driver to stay seated with his foot on the brake pedal during a door open state. In other words, it is not necessary to actuate the park brakes as long as the driver remains seated with his foot depressing the foot pedal to effect a normal service brake application, although the driver should be rewarded if a park brake application is made. It is deemed desirable to have the driver cause a service brake application to both the drive and steer axles and be in a position to undertake further action if necessary. It is further desirable to provide a system that monitors the brake application and provides an alarm or signal if certain requirements are not met.

Moreover, retrofitting existing brake systems for buses is often a tedious task. Different original equipment manufacturers (OEMs) have different pneumatic brake systems. These systems are relatively complex since they provide service braking to drive and steer axles, spring park brakes, and emergency systems that use the spring brakes if rear axle service brake capability is lost. Thus, a simple, easy to install retrofit system that does not require a high level of air system knowledge is desirable.

SUMMARY OF THE INVENTION

The present invention contemplates a new and improved apparatus and method that overcomes the above-referenced problems and others and provides a simple, effective solution which can be easily retrofitted in existing systems and integrally incorporated in OEM systems.

More particularly, an interlock assembly is provided between a bus door and service brakes so that the service brakes are automatically applied under selected conditions. An alarm associated with an autobrake assembly is responsive to at least one of inadequate pressure for service brake application and insufficient service brake application.

The system is activated in response to turning on the flashing caution lights and opening the bus door.

A pressure indicator monitors application of the parking brakes to deactivate the system once the park brakes are actuated.

A low pressure indicator is actuated in response to a low pressure system and activates the alarm.

Similarly, a pressure indicator monitors pressure delivered from a foot valve to actuate the alarm if there is an indication that the service brakes are not being applied sufficiently.

A principal advantage of the invention is realized by urging the driver to stay seated when the caution lights have been turned on and the door opened so that a normal service brake application is used.

Another advantage of the invention resides in the ability to easily retrofit the system into existing bus brake systems.

Still another advantage of the invention is the ability to provide increased confidence of warning the driver should a system malfunction and protect against misuse or failure of the system through a brake application monitoring device.

Yet another advantage is the reward provided to the driver in disabling the system, including the alarm, if the park brake is applied.

Still other advantages and benefits of the invention will become apparent to those skilled in the art upon a reading and understanding of the following detailed description.

DETAILED DESCRIPTION OF THE PREFERRED EMBODIMENTS

Figure 1:
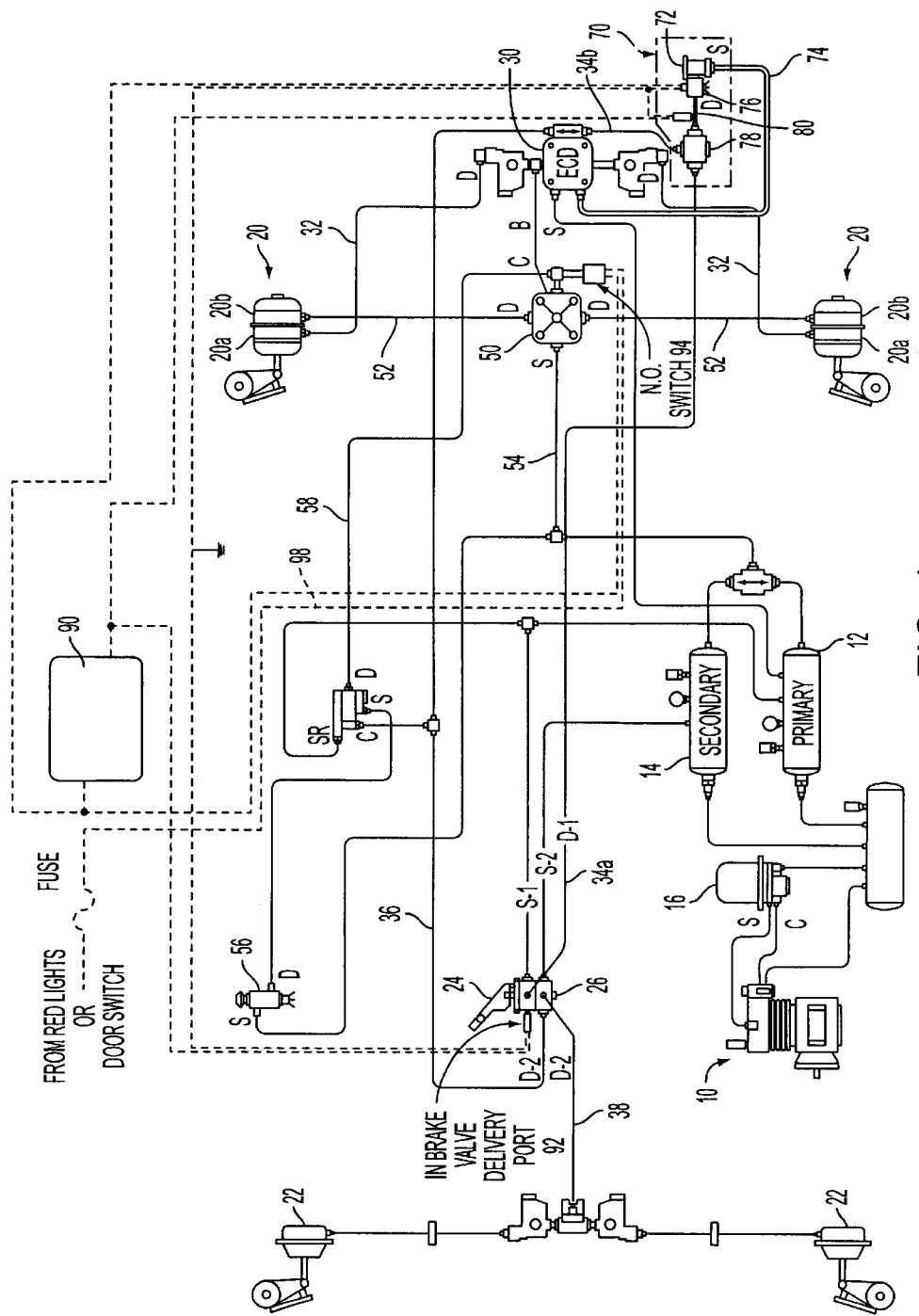
FIGS. 1–3 are schematic representations of the present invention employed in various brake arrangements, for example with an ABS/rear axle service relay, a quick-release valve, or with an ABS system.

Turning first to FIG. 1, familiarity with a conventional air brake system is presumed, although a brief review of some components is provided to generally describe the environment in which the new bus door/service brake interlock retrofit system is used. A compressor 10 selectively charges primary and second reservoirs 12, 14, preferably after passing through an air dryer 16 to remove entrained moisture. The compressed air is used to provide selective braking action to a rear or drive axle that includes brake chambers 20. In addition, a front or steering axle includes brake chambers 22 associated therewith.

A foot pedal 24 operates foot pedal control valve 26 which selectively interconnects compressed air from either the primary or secondary reservoirs to the individual brake chambers 20, 22 associated with vehicle wheels. An antilock brake system (ABS) controller relay assembly including an electronic control unit (ECU) 30 is associated with the service brake chambers 20a associated with the rear brake chambers via lines 32. In addition, the foot control valve 26 communicates with the controller relay assembly via line 34

(i.e., lines 34a and 34b). In addition, if the primary circuit is inoperative, line 36 associated with the secondary circuit delivers pressure to the control relay assembly to modulate service brakes associated with the drive axle in a manner known in the art. A line 38 extends from the control valve to the front brake chambers 22 for applying the service brakes under control of the secondary circuit. Relay valve 50 is in operative communication with the spring brake chamber 20b associated with the park brakes via lines 52. In addition, line 54 provides supply pressure from either the primary or secondary reservoir and park brake valve 56 communicates with the relay valve through line 58. Again, the structure and operation of the brake circuit described to this point is generally conventional so that further discussion herein is deemed unnecessary to a full and complete understanding of the present invention.

The bus door/service brake interlock retrofit system of the present invention includes an autobrake assembly 70 demarcated by a dot-dash line. As will be appreciated, the pneumatic components of the system are generally shown in solid line, while electrical components of the system are shown in dotted line. The autobrake assembly 70 includes a pressure reducing valve 72 that selectively reduces supply pressure from line 74 to a reduced level, for example 44 psi. An electro-pneumatic solenoid 76 (or solenoid/synchronization valve assembly) receives the reduced pressure air from valve 72 and for delivery to one side of double check valve 78. The other side of the double check valve is connected with line 34 from the foot valve, particularly line portion 34a. The remainder 34b of the line that normally communicates with the ABS controller relay assembly 30 communicates with the outlet of the double check valve. In other words, the module 70 is easily connected into line 34 by merely cutting and splicing the autobrake assembly 70 into place.

The autobrake assembly further includes a low pressure indicator 80 that monitors the pressure level delivered by this auxiliary brake supply. The low pressure indicator communicates with an alarm 90 to provide an audible, visible, or combined audible/visible signal to alert the driver that the system has insufficient pressure, for example, less than 25 psi. Of course, other pressure levels can be used as the cut-off to alert the driver if desired.

In addition, a low pressure indicator 92 is associated with the foot valve and also communicates with the alarm 90. Again, the alarm is activated if insufficient pressure or service braking is detected by the monitor 92. Likewise, the double check valve 78 uses the pressure from the autobrake assembly provided through pressure reducing valve 72 if the foot valve pressure through line 34a is insufficient.

A normally open switch 94 is also associated with the relay valve 50. The normally open switch is responsive to the flashing or caution lights associated with the bus and the door switch as represented by line 98. Once the driver turns on the caution lights and opens the door, the autobrake system of the present application is activated. This prevents the system from inadvertently turning on when the bus is traveling down the road. Thus, the sequential light operation in which the driver uses the caution lights and opens the door activates the autobrake system. Switch 94 deactivates the system when the vehicle is parked. Power to the system is fed from the existing flasher lamp control panel so that no special or complicated electrical arrangement is encountered in adapting the present invention to an existing bus.

In addition, if the driver actuates the park valve 56 to apply the spring brakes, i.e., the bus is parked, the autobrake system is turned off. Thus, once the park brake is actuated, the driver may leave his seat without activating the system including the alarm. On the other hand, if the park brake is not actuated, and the system is activated via the caution lights and open door, the driver is encouraged to stay seated with his foot on the brake valve to effect normal service braking. If the driver lifts his foot from the brake pedal, or encounters a cramp in his leg, then the alarm is triggered and a supplemental or auxiliary supply is provided to maintain the service braking. In addition, the driver is forewarned if a system malfunction has occurred in which normal service brake pressure is not achieved.

In summary, a regulated pressure is provided in the autobrake assembly. A solenoid is energized and allows the regulated pressure to reach the double check valve, with the foot valve operatively associated with the other side of the double check valve. The delivery from the double check valve continues to supply the brake circuit in a normal manner. If the air brake system does not provide at least 25 psi when the system is electrically engaged, then a buzzer or alarm is activated to inform the driver that the necessary pressure has not been attained. If the driver actuates the park brake, the system is turned off, i.e., the solenoid is turned off and the buzzer or alarm is deactivated. Thus, when the driver leaves the bus, the system or alarm will not be inadvertently activated once the vehicle has been parked.

By using different types of connections or fittings, the autobrake module can be assured of assembly in one manner only. For example, a threaded fitting can be used at one end and a push-to-connect fitting at another end. The electrical components can have keyed or different sized connectors to, again, assure that only the proper connections are made in retrofitting the interlock system/into the bus.

Figure 2:
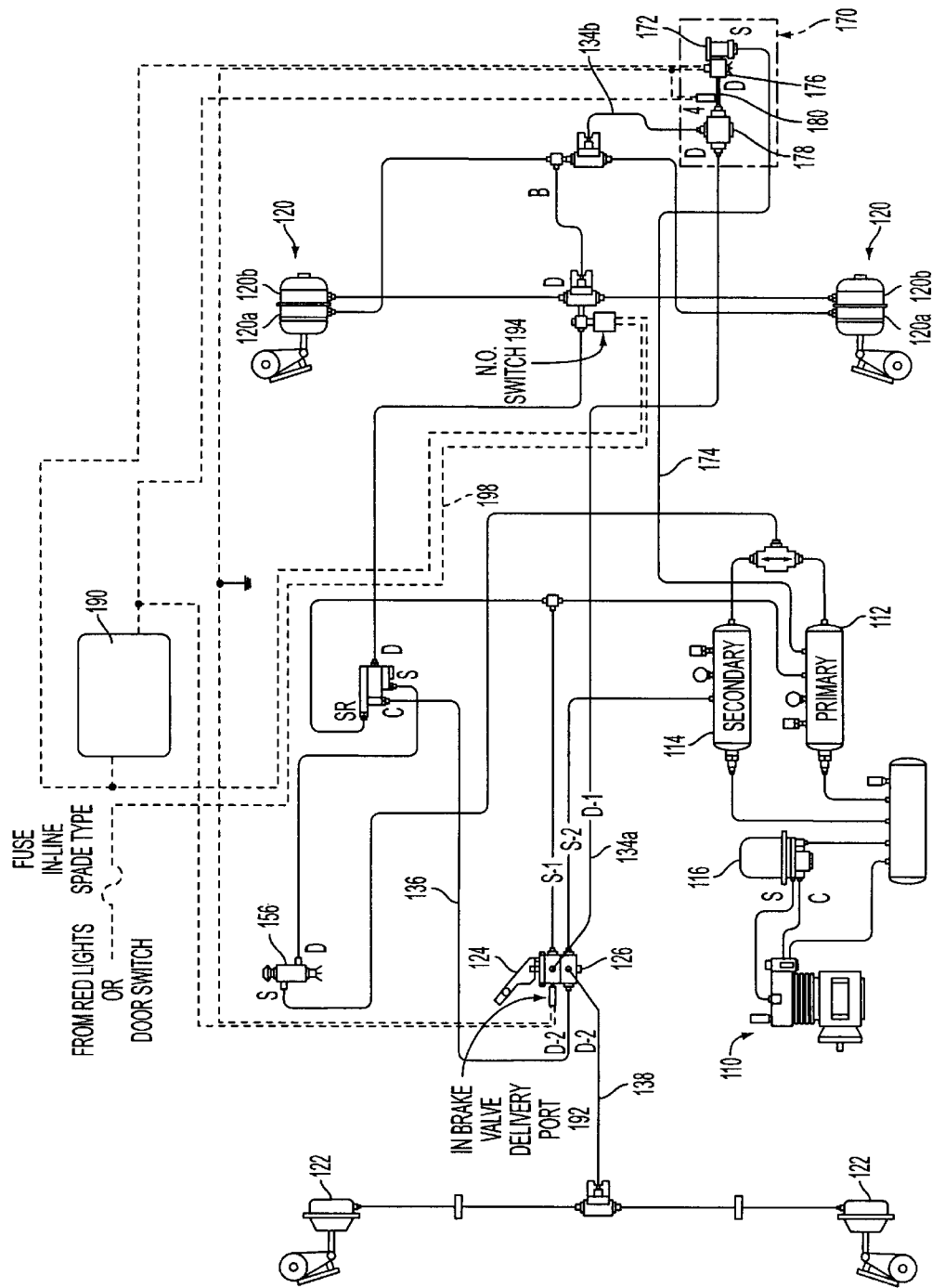

Turning to FIG. 2, the similarities in the system are apparent when used with a rear axle employing quick-release valves. The different plumbing associated with this system illustrates the desired ease with which the interlock system is retrofitted into the brake system. Like numerals increased by a factor of "100" are used to identify like elements (e.g., compressor 10 is now identified as compressor 110). The structure and operation is substantially identical unless specifically noted to the contrary. The autobrake assembly 170 is connected into the delivery line 134a extending from the foot valve 126. The autobrake assembly is also connected to supply pressure provided by the primary reservoir through a line 174. It will also be appreciated that, if necessary, the solenoid can be used in conjunction with a synchronization valve where a sufficiently large solenoid is unable to meet the system demands. The low pressure indicator or monitor 192 is associated with the foot valve and the normally open switch 194 is associated with the delivery from the park brake in conjunction with the caution lights and door switch provided through electrical line 198.

Figure 3:
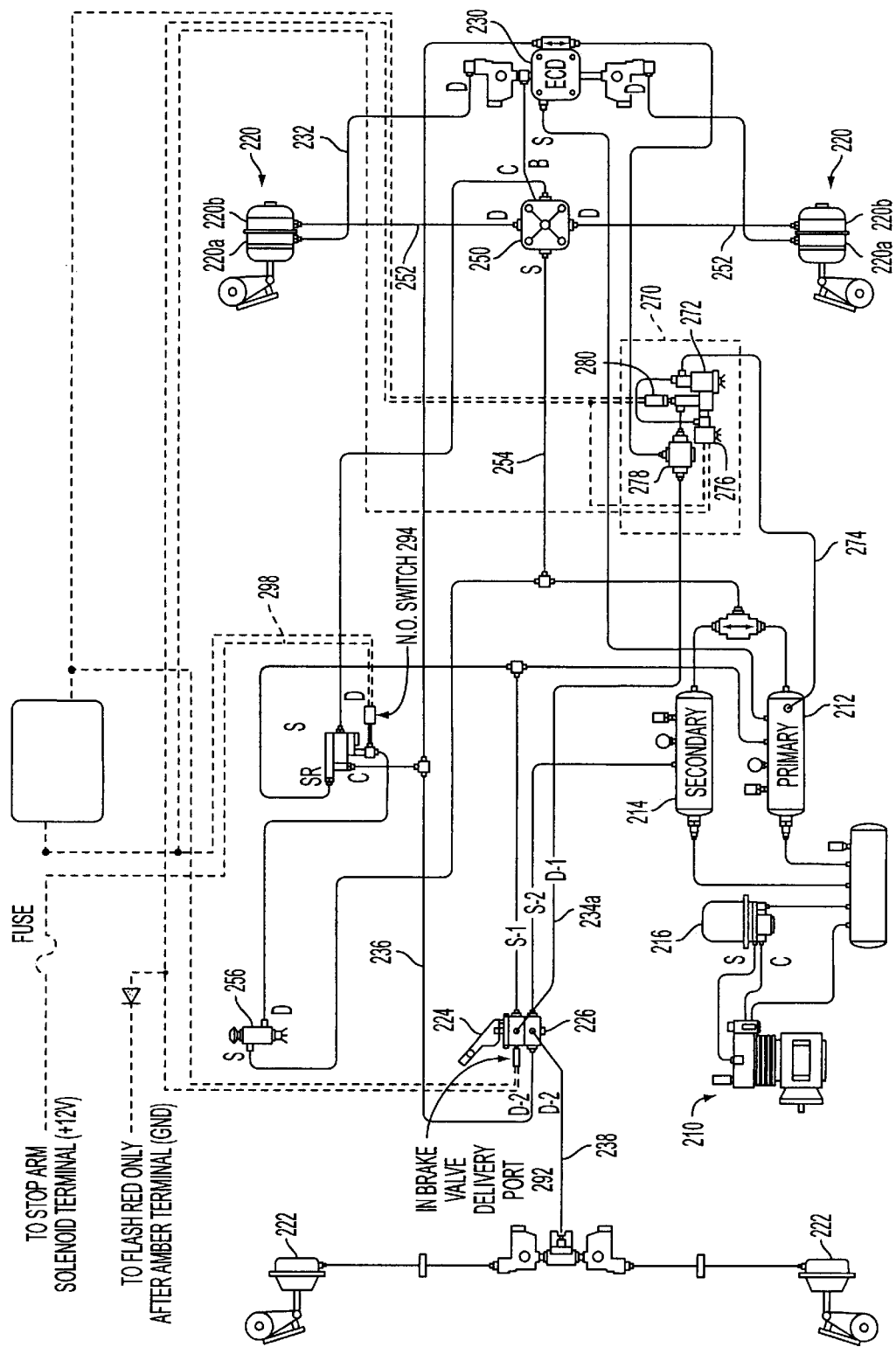

FIG. 3 illustrates the interlock system employed in a rear only ABS system and thus because of the common features, like numerals increased by a factor of "200" are used to identify like elements (e.g., compressor 10 is now identified as compressor 210). An additional supply line 274 extends from the primary reservoir to the autobrake assembly 270. In addition, the pressure reducing valve 272 is associated with a combination solenoid and synchronization valve to illustrate that a suitably sized solenoid may not be available and must be combined with a synchronization valve to achieve the same function.

The location of the normally open switch 294 is also slightly altered in this arrangement. Rather than being located adjacent the relay valve as in FIG. 1, it is more closely associated with the spring brake associated with the park brake. Nevertheless, its structure and function of activating the system in response to turning on the caution lights and opening the door as provided through line 298 are substantially the same.

In summary, a simple auxiliary brake control device that controls a single circuit and maintains a high degree of confidence should the system malfunction. The driver is encouraged to remain seated with the foot valve applied and a warning will be provided if insufficient service brake pressure is being supplied or the overall system pressure is below a desired level once the flashing caution lights and door are opened. Parking the vehicle will disable the system. A modular arrangement is also conducive to retrofitting a system that may be adapted to a wide variety of OEM arrangements and does not require a high technical level of the air system.

The invention has been described with reference to the preferred embodiment. Modifications and alterations will occur to others upon reading and understanding this detailed specification. It is intended to include all such modifications and alterations in so far as they come within the scope of the appended claims and equivalents thereof.

I claim:

1. A bus door and service brake interlock assembly, used in conjunction with a vehicle including a service brake and a park brake, comprising:
   an autobrake assembly disposed between an air source and the service brake for automatically applying the service brake under selected conditions; and
   an alarm operatively associated with the autobrake assembly, the alarm responsive to at least one of inadequate pressure for service brake application and insufficient service brake application.

2. The assembly of claim 1 wherein the autobrake assembly is retrofitted in the delivery line interconnecting a foot brake delivery port with a control unit that selectively controls application of the drive axle brakes.

3. The assembly of claim 1 wherein the alarm is responsive to both inadequate pressure for service brake application and insufficient service brake application.

4. The assembly of claim 1 wherein the alarm is only activated in response to at least one of flashing lights and opening of the bus door.

5. The assembly of claim 1 wherein the alarm is activated in response to flashing lights and opening of the bus door.

6. The assembly of claim 1 wherein the autobrake assembly includes a low pressure indicator that is selectively actuated in response to low pressure being supplied to the service brake.

7. The assembly of claim 6 wherein the low pressure indicator, which is normally open, closes in response to low pressure and activates the alarm.

8. The assembly of claim 1 further comprising a pressure indicator that monitors pressure delivered from a foot valve that activates the alarm in response to a low or no pressure condition at the foot valve.

9. The assembly of claim 1 further comprising a pressure indicator operatively associated with a park brake valve for deactivating the autobrake assembly upon actuation of the park brakes.

10. The assembly of claim 1 wherein the alarm includes an audible buzzer for alerting the bus driver.

11. The assembly of claim 1 wherein the autobrake assembly and alarm are adapted for retrofitting on a bus with connections between components of the system.

12. An interlock assembly for use with a bus having driver operated caution lights and a door, and a service brake assembly having a supply of pressure that is used for selectively applying a service brakes and a spring park brakes in response to driver operation of a foot valve and park valve, the interlock assembly comprising:
    a supplemental assembly for applying the service brakes under selected conditions if the foot valve is inoperable or operating at an insufficient pressure; and
    an alarm that warns a driver of at least one of insufficient pressure for service brake application from the foot valve and insufficient service brake pressure.

13. The assembly of claim 12 wherein the supplemental assembly is only operative under the selected conditions, which are met when the caution lights arc turned on and the door is opened.

14. The assembly of claim 12 wherein the supplemental assembly is deactivated in response to application of the park brake.

15. The assembly of claim 12 wherein the supplemental assembly includes a solenoid that, when energized, conveys air pressure to a double check valve that communicates with the foot valve and delivers pressure for service braking.

16. The assembly of claim 12 further comprising a first low pressure indicator operatively associated with the foot valve and providing an indication of insufficient service braking pressure at the foot valve.

17. The assembly of claim 16 further comprising a second low pressure indicator operatively associated with the supplemental assembly for indicating insufficient service braking pressure.

* * * * *

UNITED STATES PATENT AND TRADEMARK OFFICE
CERTIFICATE OF CORRECTION

PATENT NO.   : 6,702,400 B1
DATED        : March 9, 2004
INVENTOR(S)  : Charles E. Eberling It is certified that error appears in the above-identified patent and that said Letters Patent is hereby corrected as shown below:

Column 4,
Line 32, please delete "system/into" and insert -- sytem into --

Column 6,
Lines 12, 21, 22 and 24, please delete "brakes" and insert -- brake --
Line 33, please delete "arc" and insert -- are --

Signed and Sealed this

Thirty-first Day of August, 2004

JON W. DUDAS
*Director of the United States Patent and Trademark Office*